United States Patent [19]
Woollenweber, Jr.

[11] 4,008,572
[45] * Feb. 22, 1977

[54] TURBINE HOUSING
[75] Inventor: William E. Woollenweber, Jr., Columbus, Ind.
[73] Assignee: Cummins Engine Company, Inc., Columbus, Ind.
[ * ] Notice: The portion of the term of this patent subsequent to Jan. 6, 1993, has been disclaimed.
[22] Filed: Feb. 25, 1975
[21] Appl. No.: 552,861
[52] U.S. Cl. .................................. 60/602; 60/605; 60/615; 415/205
[51] Int. Cl.² .......................................... F02D 23/00
[58] Field of Search ............ 415/203, 205; 60/597, 60/598, 602, 605, 615, 624

[56] References Cited
UNITED STATES PATENTS

| | | | |
|---|---|---|---|
| 2,899,797 | 8/1959 | Birmann | 60/605 |
| 3,137,477 | 6/1964 | Kofink | 415/205 |
| 3,313,518 | 4/1967 | Nancarrow | 415/205 |
| 3,557,549 | 1/1971 | Webster | 60/602 |
| 3,591,959 | 7/1971 | Kubis | 60/605 |
| 3,614,259 | 10/1971 | Neff | 415/205 |
| 3,930,747 | 1/1976 | Woollenweber | 415/205 |

Primary Examiner—Wendell E. Burns
Assistant Examiner—David D. Reynolds
Attorney, Agent, or Firm—Hibben, Noyes & Bicknell, Ltd.

[57] ABSTRACT

This disclosure deals with a centripetal flow turbine housing including an intake opening for receiving a working fluid, a volute which conveys the fluid to a turbine wheel rotatably mounted within the housing, and an outlet opening co-axial with the wheel. A valve is provided adjacent the intake opening, and two intake passages are formed in the housing between the valve and the volute. One of the intake passages is arranged concentrically around the other intake passage, and the intake passages merge ahead of the volute to form generally concentric aspirating nozzles. The valve is adjustable to one position where it directs all of the working fluid through one intake passage, and to a second position where it directs the working fluid through both intake passages. The turbine housing may be used with an internal combustion engine having a divided exhaust manifold to obtain pulse turbine operation, or it may be used with an internal combustion engine such as a two-cycle engine without a divided exhaust manifold to assist in starting and low speed engine performance.

15 Claims, 6 Drawing Figures

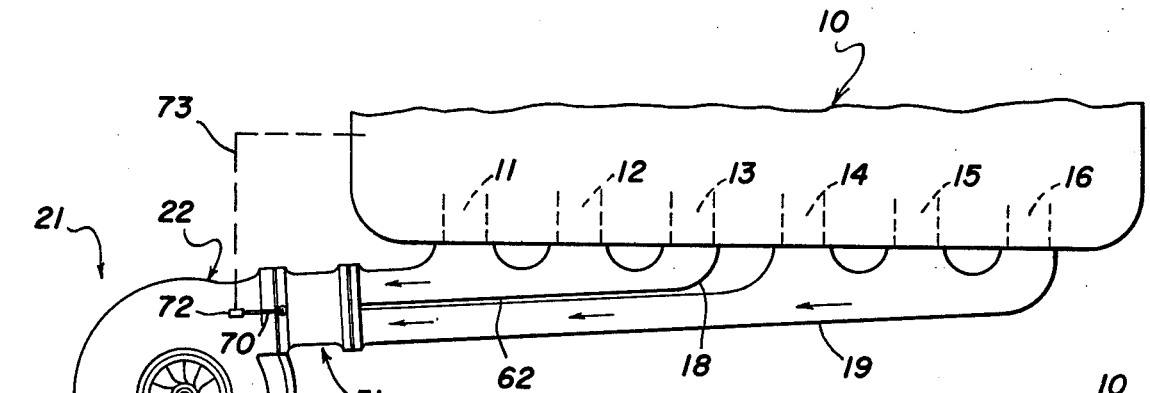
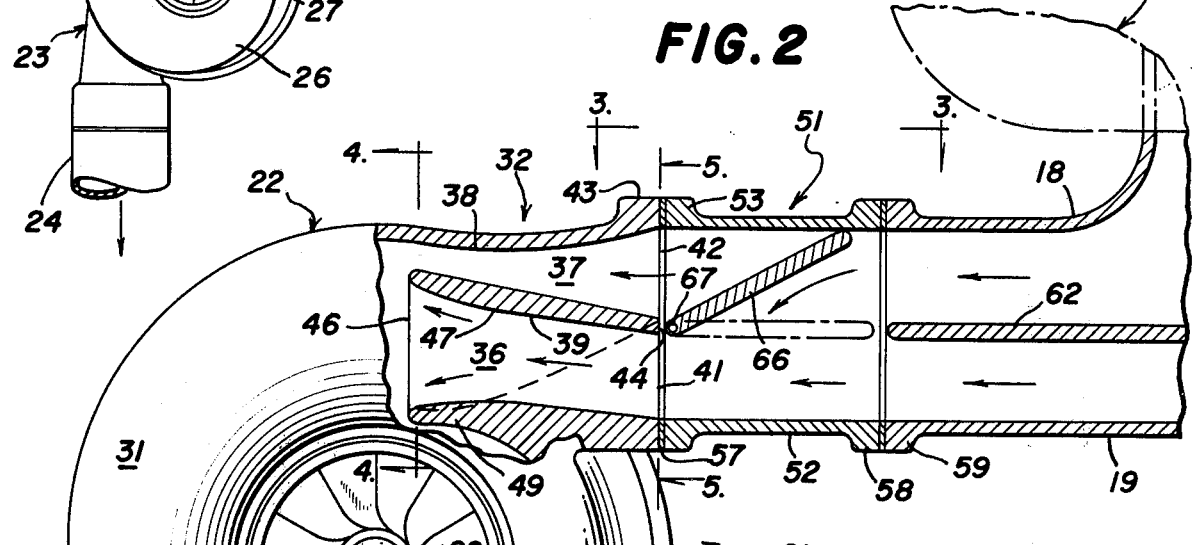
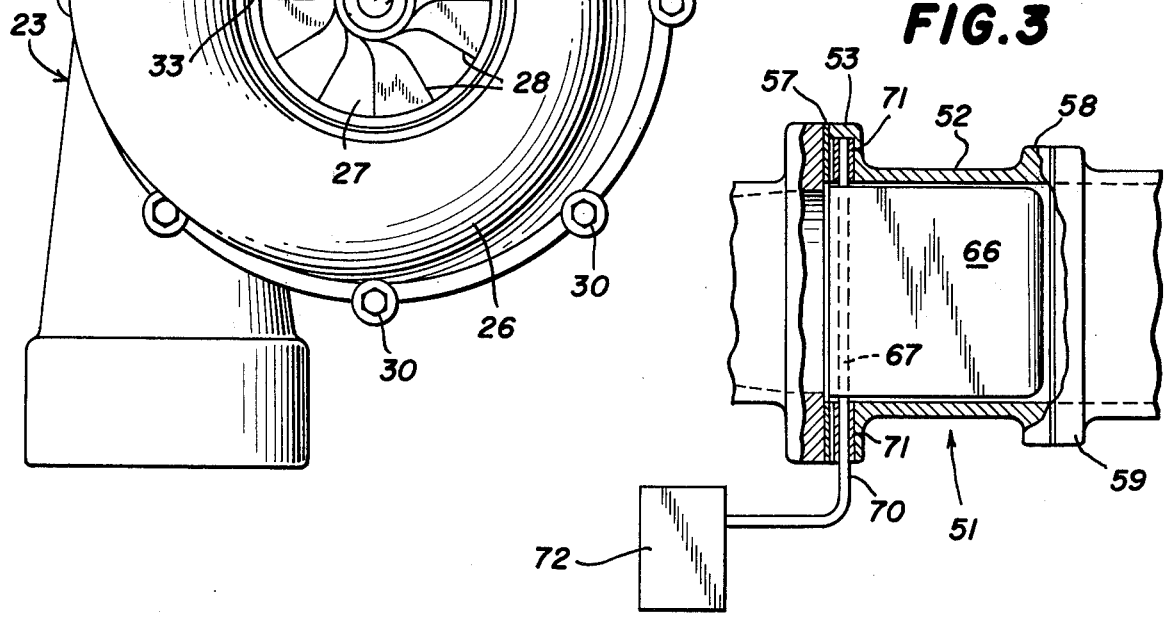

TURBINE HOUSING

DISCLOSURE

One type of prior art turbocharger for an internal combustion engine includes a turbine housing forming a volute which is divided into two annular side-by-side passages, and a diverter valve for controlling the flow of exhaust gases through one or both of the passages of the volute. The Neff U.S. Pat. No. 3,614,259 and the Connor U.S. Pat. No. 3,270,495 disclose turbine housings of this character. A disadvantage of such a construction is that the wall which divides the volute into two passages extends throughout the circumference of the housing and it is subject to becoming warped and cracked by heating and cooling. Further, the passages do not form ideally shaped nozzles, thus producing lower efficiency than is desired.

Another type of turbocharger housing exists, of the character shown in W. E. Woollenweber U.S. Pat. No. 3,408,046 and W. E. Woollenweber U.S. Pat. No. 3,930,947 issued Jan. 6, 1976, and entitled Turbine Housing, wherein a dividing wall terminates ahead of the volute section. While this type of turbine housing produces increased efficiency during average engine speeds, it does not provide the turbocharger boost pressure desired during low engine speeds because the exhaust gas velocity is too low.

It is therefore an object of the present invention to provide an improved turbine housing for a centripetal flow turbine, which overcomes the deficiencies of the prior art housings. A turbine housing in accordance with the present invention comprises a volute section, an outlet opening communicating with the radially inner side of said volute section, and two inlet passages for conveying a working fluid to said volute section. Two passages are formed by outer and inner walls of the housing, the walls being shaped such that one of the passages substantially surrounds the other passage, and the inner wall terminating ahead of the volute section. At the point where the inner wall terminates, the two passages form substantially concentric nozzles. Two inlet openings are formed adjacent the upstream ends of the intake passages, and a diverter valve is mounted adjacent the inlet openings. The valve is adjustable to one position where it directs all of the working fluid through only one inlet passage and this passage may be shaped to form a supersonic nozzle. The valve is also adjustable to a second position where it directs the working fluid through both inlet passages.

Control means may be provided for automatically moving the valve in response to one or more engine operating parameters.

Additional objects and advantages of the present invention will become apparent from the following detailed description taken in conjunction with the accompanying figures of the drawings, wherein:

FIG. 1 is a fragmentary view of apparatus including a turbine housing embodying the invention;

FIG. 2 is an enlarged fragmentary view, partially in section, of the housing;

FIG. 3 is a fragmentary sectional view taken on the line 3—3 of FIG. 2;

Figure 4:
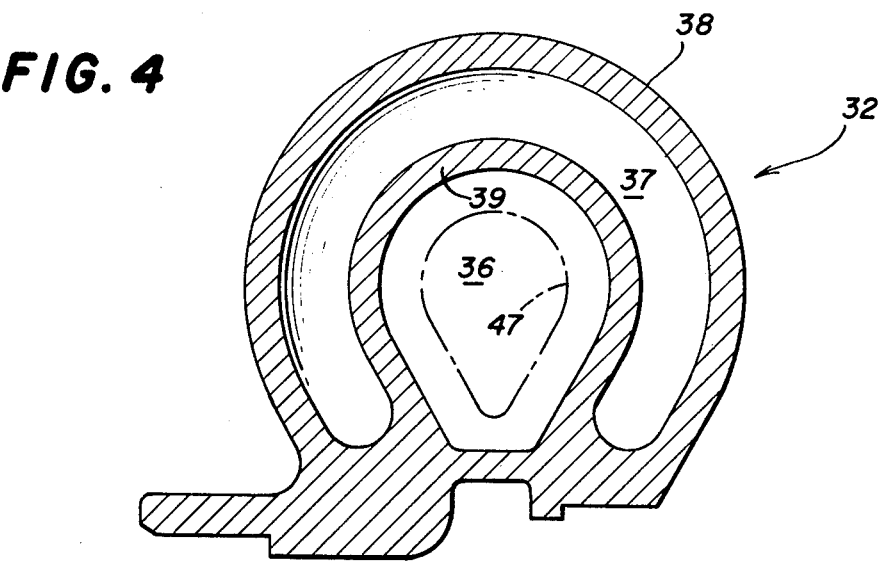
FIG. 4 is a further enlarged sectional view taken on the line 4—4 of FIG. 2.

With reference to FIG. 1, the invention is illustrated in connection with an internal combustion engine wherein the working fluid which drives the turbine is the exhaust gases from the engine. It should be understood, however, that the principles of the invention may also be applied to turbines of other types. The engine includes a block 10 having six combustion chambers (not shown) and a plurality of exhaust ports 11 through 16 formed therein. The engine may, for example, be a compression ignition engine, and a typical firing order for such an engine is 1-5-3-6-2-4, wherein the exhaust port 11 is connected to the number 1 chamber. An exhaust manifold is connected to receive the exhaust gases from the ports 11 through 16, the manifold being divided into two branches 18 and 19. The branch 18 is connected to the exhaust ports 11 to 13 and the branch 19 is connected to the ports 14 to 16. Thus, with the previously mentioned firing order of the combustion chambers, the two branches 18 and 19 will alternately, and sequentially, receive bursts or pulses of the exhaust gases from the combustion chambers. The exhaust manifold branches 18 and 19 are connected to a turbocharger 21 which includes a turbine 22 and a compressor 23. The compressor 23, which may have a conventional construction, is driven by the turbine 22 and pumps intake air to a conduit 24 that is connected to an intake manifold (not shown) of the engine.

A turbine 22 comprises a housing or casing 26 and a turbine wheel or rotor 27. The wheel 27 includes a plurality of radially extending blades 28, and the wheel 27 is secured to a centrally located shaft 29. The shaft 29 is rotatably mounted, in a conventional manner, in a bearing housing (not shown) of the turbocharger and it is connected to drive a rotor (not shown) of the compressor 23. A plurality of bolts 30 secure the turbine and bearing housings together.

The turbine housing 26 forms a volute section 31, an inlet section 32, and an outlet opening 33 (FIG. 2). Exhaust gases flowing from the exhaust manifold branches 18 and 19 flow into the turbine housing 26 through the inlet section 32, flow circumferentially and radially through the volute section 31, through channels or passages between the turbine blades 28, and then flow out of the turbine housing through the outlet passage 33.

Figure 5:
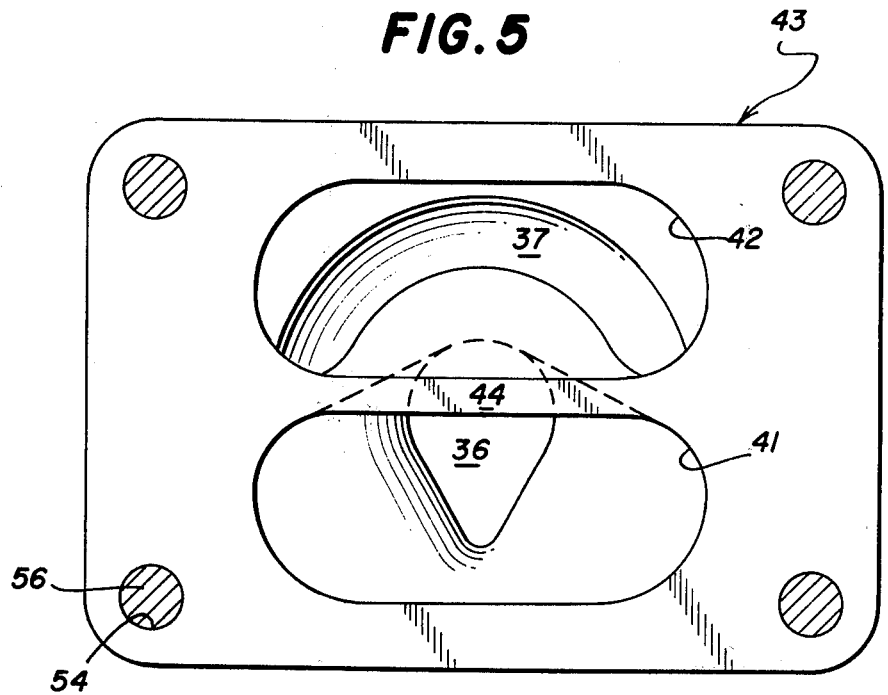
FIG. 5 is an enlarged view taken on the line 5—5 of FIG. 2.

With specific reference to FIGS. 2, 4 and 5, the inlet section 32 of the turbine housing 26 includes an inner passage 36 and an outer passage 37. The two passages 36 and 37 are formed by an outer wall 38 of the housing and by an inner wall 39, the inner wall 39 being arranged within the outer wall 38 as shown in FIGS. 2 and 4. Two inlet openings 41 and 42 (FIGS. 2 and 5) are formed in a connecting flange 43 of the housing 26, the inlet openings 41 and 42 respectively communicating with the passages 36 and 37. The outer wall 38 is flared outwardly slightly, as shown in FIG. 2, to form the flange 43, and the inner wall 39 extends up to and terminates at an end 44 which is flush with the end surface of the flange 43. The inner wall 39 extends from the end 44 toward the volute section 31 and terminates at an end 46 (FIG. 2) which is adjacent the entrance of the volute section. At the end 46, the two passages 36 and 37 merge, and at this point the passage 37 substantially surrounds the inner passage 36, thus forming generally concentric aspirating nozzles (FIG.

4). The throat 47 of the inner passage 36 is preferably shaped to form a supersonic nozzle, as shown in FIG. 2. The throat 47 is also shown by a dash-dot line in FIG. 4. With reference to FIG. 5, at the flange 43 the two inlet openings 41 and 42 are arranged in side-by-side relation and have similar elongated configurations. From the flange 43, the outer wall 38 curves to form a nearly circular section as shown in FIG. 4 and extends to form the outer wall of the volute section 31. The inner wall 39 starts out as a straight section at the upstream end 44 and curves to form the arcuate section at the downstream end 46 (FIG. 4). At the end 46 where the passages merge, the two passages 36 and 37 are substantially concentric, the outer passage 37, in the present illustration, extending over approximately a 270° arc around the inner passage 36. At the end 46, the passage 36 has a smaller diameter than the passage 37. While the two passages 36 and 37 are shown as having substantially the same flow area, one may be made somewhat smaller than the other to accommodate specific operational characteristics.

As is shown in FIG. 2, at the end 46 where the two passages 36 and 37 merge, they direct the gas flow from right to left, as seen in FIG. 2, and the gases enter the volute section 31 in substantially a tangential direction with respect to the turbine wheel 27. The remainder of the volute section 31 has a generally conventional construction, the cross-sectional area of the volute section gradually decreasing in the counterclockwise direction from the end 46, the outer wall of the volute at the downstream end thereof being indicated by the reference numeral 49. The volute section 31 of course forms a single undivided passage.

Figure 6:
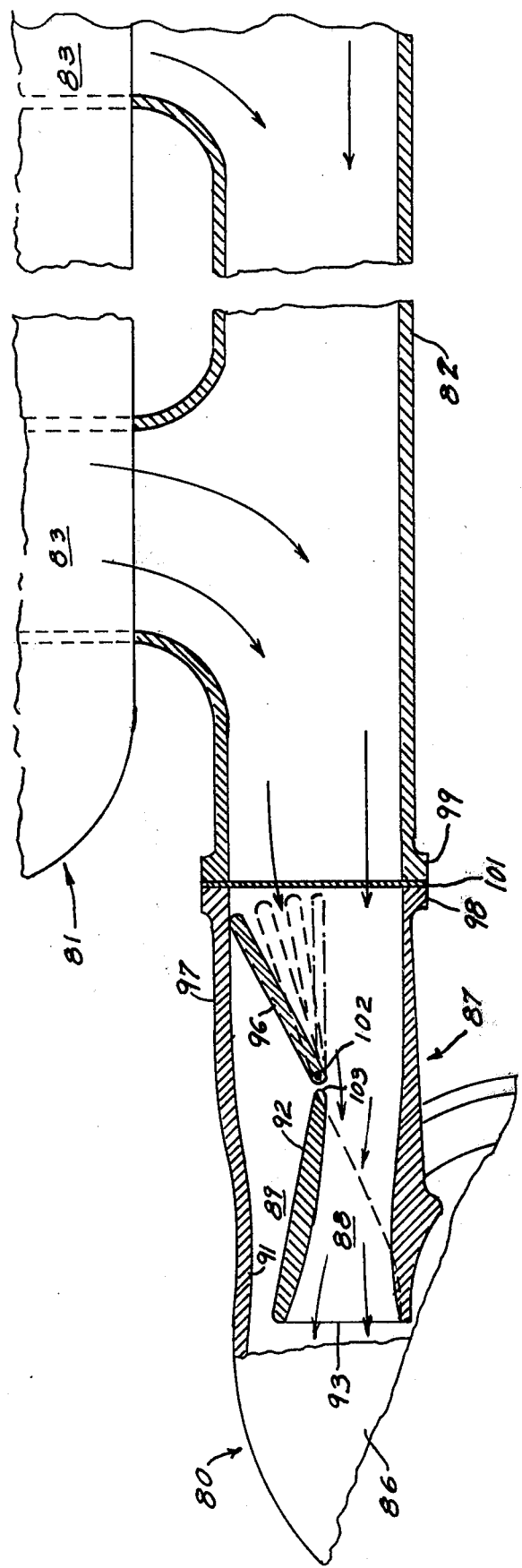
FIG. 6 is a view similar to FIG. 2 but illustrating an alternate construction.

While the engine is being started or is idling, the volume of exhaust gases flowing out of the exhaust ports 11 through 16 is relatively small, and as a consequence, the velocity of the exhaust gases flowing through each of the passages 36 and 37 would be relatively low, resulting in less compressor boost than is desired. To remedy this situation, a diverter valve 51 (FIGS. 2 and 3) is provided to direct all of the exhaust gases through one of the two inlet passages 36 and 37 at selected times during the operation of the engine. In the present instance, all of the exhaust gases are directed by the valve 51 through the inner passage 36 during starting, idling and low engine speeds, the passage 36 being chosen because it has an ideally shaped nozzle configuration. While the diverter valve 51 could be formed as an integral part of the turbine housing 26 as shown in FIG. 6, in the present instance, it is shown as a separate part connected between the flange 43 of the housing 26 and the exhaust manifold branches 18 and 19. The diverter valve 51 comprises a housing 52 having an interior dimension approximately equal to that of the combined openings 41 and 42. At the end of the housing 52, which is adjacent the turbine housing 26, a connecting flange 53 is provided that mates with the flange 43. Holes 54 (FIG. 5) are formed at the corners of the flanges 43 and 53 and bolts 56 are provided to secure the flanges 43 and 53 together. A gasket 57 may also be provided between the flanges 43 and 53. At the other end of the valve housing 52 is provided a second connecting flange 58 which is shaped similarly to the flange 53 and is connected to a flange 59 formed at the ends of exhaust manifold branches 18 and 19. As best shown in FIG. 2, the two branches 18 and 19 are formed with a common divider or wall 62.

With specific reference to FIGS. 2 and 3, mounted within the valve housing 52 is a flapper 66 which has a generally square, flat shape and is pivotally mounted by a pin 67 for pivotal movement adjacent the end 44 of the inner wall 39 (FIG. 2). As shown in FIG. 3, the length of the flapper 66, taken in the direction of the flow of the exhaust gases, is substantially as long as the housing 52, and it extends from the end 44 up to the divider 62 between the two branches 18 and 19. In the other direction, which is lateral to the direction of gas flow, the valve 66 extends from the bottom side to the top side of the housing 52, as shown in FIG. 3. The valve 66 is secured to the pin 67 along its downstream edge, and the upper and lower ends of the pin 67 are pivotally mounted by suitable bearings 71 in the flange 53 of the housing 52. One end 70 of the pin 67 extends out of the housing 52 and is connected to an actuator 72 which controls the pivotal movement of the pin 67. By turning the pin 67, the valve 66 may be swung about the axis of the pin between the solid line position and the dash-dot position shown in FIG. 2, and to other positions intermediate the two illustrated positions. In the dash-dot position, the valve 66 is aligned with the end 44 of the inner wall 39 and with the divider 62, and in this position, the exhaust gases from the two branches 18 and 19 are directed through both inlet passages 36 and 37 and into the volute section 31. As previously mentioned, the combustion chambers connected to the ports 11 through 16 fire in sequential manner and the arrangement of the branches 18 and 19 is such that pulses or bursts of gas appear alternately in the two branches 18 and 19. Consequently, bursts of gas will flow alternately through the passages 36 and 37, in pulse turbine type operation. When a burst of gas flows through the passage 36 and into the volute section 31, it creates, by an aspirating action, low-pressure in the other passage 37, and conversely when the gas flows through the passage 37, it creates, again by an aspirating action, low pressure in the passage 36. Consequently, gas flowing through one of the passages 36 and 37 creates a low pressure condition in the other passage and the associated manifold branch. Consequently, the present construction results in both increased turbocharger efficiency and engine efficiency.

During starting, idling or low speed operation of the engine, when the volume of the exhaust gases is low, the valve 66 is pivoted to the solid line position shown in FIG. 2 where the upstream or outer end of the valve 66 engages the inner surface of the outer wall 52 in front of the passage 37. Consequently, the exhaust gases flowing from both both of the branches 18 and 19 are directed through the inner passage 36 because the valve 66 completely blocks off the outer passage 37. The valve 66 is preferably at a small angle relative to the direction of gas flow so that the deflection of the gas does not produce excessive turbulence and losses. As soon as the engine speed reaches higher values producing an excess of exhaust gas energy and flow, the valve 66 may be returned to the dash-dot position shown in FIG. 2, thus opening the outer nozzle passage 37 and thereby preventing the turbine speed from becoming excessive and preventing over boosting of the engine cylinders.

While the member 72 may be arranged for hand operation of the pin 67 in order to pivot the valve 66 to a desired position, it is preferred that it be done automatically by the actuator 72 which operates in response to one or more operating parameters of the engine. The actuator 72 may, for example, be constructed to respond, via a connection 73 (FIG. 1), to engine speed and/or to the intake manifold air pressure and to automatically move the valve 66 in response to these parameters.

While the valve 66 has been shown as being movable to two positions, one where it directs all of the exhaust gases through the inner passage 36 and the other where it directs the exhaust gases through both of the passages 36 and 37, the valve 66 could be arranged so that it is movable to three different positions, one where it directs the exhaust gases through the inner passage 36, another where it directs all the gases through the outer passage 37, and the third position where it divides the exhaust gases between the two passages 36 and 37.

It will be apparent from the foregoing discussion and from the drawings that a novel and useful turbocharger has been provided. The concentric nozzle arrangement with an open volute produces turbine operation having a high efficiency. Even though the inlet passages are divided and produce an aspirating action, there is no divider wall in the volute. A valve arrangement in combination with the concentric nozzle construction as described produce high operating efficiency both at low engine speeds and at normal engine speeds.

At low gas volumes existing at low engine speeds, the gas is directed through an ideally shaped nozzle which produces a gas velocity sufficient to drive the turbine and compressor at a relatively high speed. The compressor therefore produces sufficient boost pressure. The turbine speed would however produce excessive boost pressure if all the gases were directed through this single nozzle at normal engine speeds. The diverter valve therefore enables the gas velocity, and the turbine speed, to be reduced by opening up both inlet passages at normal engine speeds. In addition to being responsive to engine speed, the actuator 72 could be connected to respond to acceleration of the engine and override the engine speed signal in order to place the valve 66 in the solid line, or diverted, position shown in FIG. 2. The use of the previously mentioned ideally shaped nozzle of the passage 36 results in less wetted area of the turbine and fewer losses as compared with side-by-side turbine passages as described in the previously mentioned Neff U.S. Pat. No. 3,614,259.

FIG. 6 illustrates another form of turbine housing 80 used in conjunction with an internal combustion engine 81 including an undivided exhaust manifold 82. The engine includes a plurality of combustion chambers (not shown) which are connected by exhaust passages 83 to the manifold 82. The undivided manifold 82 is connected to all of the exhaust passages 83, and consequently all of the exhaust gases mix and flow to the turbine housing through the manifold 82.

The turbine housing comprises a volute section 86 and an inlet section 87. Other parts of the turbine not illustrated in FIG. 6 may have the same construction shown in FIG. 2.

The inlet section 87 includes an inner passage 88 and an outer passage 89, the two passages 88 and 89 being formed by an outer wall 91 of the housing and by an inner wall 92, similar to the arrangement shown in FIG. 2. The inner wall 92 terminates at an end 93 which is adjacent the entrance of the volute section, and at this point the two passages 88 and 89 merge and forming generally concentric aspirating nozzles. The throat of the inner passage 88 is preferably shaped to form a supersonic nozzle. The curvature of the walls 91 and 92 that form the aspirating nozzles may be the same as that shown in FIGS. 2, 4 and 5.

The turbine housing 80 further includes a flapper valve 96 which is mounted in a housing 97 that is an integral part of the outer wall 91. The housing 97 could however be a separate member fastened to the outer wall 91 as is shown in FIG. 2. The housing 97 has an interior dimension approximately equal to that of the outer passage 89. At the upstream end of the valve housing 97 is provided a connecting flange 98 which is connected to a flange 99 formed at the end of exhaust manifold 82, and a gasket 101 may be positioned between the flanges 98 and 99.

Mounted within the valve housing 99 is the flapper valve 96 which has a generally square, flat shape and is pivotally mounted by a pin 102 for a pivotal movement adjacent the upstream end 103 of the inner wall 92. The lengths of the wall 92 and the valve 96 are substantially the same as the wall 39 and the valve 66. The flapper 96 extends from closely adjacent the end 103 up to the flange 98. The valve 96 also extends from the bottom side to the top side of the housing 97. The valve 96 is secured to the pin 102 along its downstream edge, and the upper and lower ends of the pin 102 are pivotally mounted by suitable bearings (not shown) similar to the bearings 71. One end of the pin 102 extends out of the housing 97 and is connected to an actuator which controls the pivotal movement of the pin 102. By turning the pin 102, the valve 96 may be swung about the axis of the pin between the solid line position, the dash-dot position shown in FIG. 6 and to other positions intermediate the two illustrated positions as shown in dashed lines.

Considering the operation of the turbine housing illustrated in FIG. 2, during starting, idling and low engine speed operation, the valve 96 is placed in the solid line position where it diverts all of the gases through the inner passage 88. This results in a relatively high gas velocity and rotor speeds, and thereby provides increased compressor boost pressure as compared with conventional turbines. This is particularly advantageous when the engine 81 is a two-cycle diesel engine because it enables such an engine to be started without the use of the conventional positive displacement mechanically driven blower. Such an engine normally requires a blower to provide sufficient scavenging in order to get the engine started. When using a turbine housing in accordance with the present invention, the combustion chambers are sufficiently scavenged to enable starting by placing the valve 96 in the diverted or solid line position, without the need for a separate blower.

After the engine 81 has been started and the speed is increased, the valve 96 is moved through the intermediate positions to the dash-dot line position. Proportionately smaller amounts of gases flow through the inner passage 88 and the effective total nozzle flow area increases. This operates to maintain the gas flow and rotor speeds low enough to prevent excessive boosting at high engine speeds.

While the valve 96 may be connected to be operated by hand, it is preferred than an actuator similar to the actuator 72 be provided, to automatically adjust the position of the valve 96 in accordance with selected engine operating parameters.

I claim:

1. A turbine housing for a centripetal flow turbine used with a driving fluid source which supplies varying volumes of said driving fluid, comprising means forming a first inlet passageway for receiving said fluid flow, a volute section formed from said first inlet passageway for discharging said fluid flow, means forming an additional inlet passageway for receiving said fluid flow and defining an outlet for directing said fluid flow in a direction which is substantially parallel to the direction of flow through said first inlet passageway, said additional inlet passageway being contained within said first inlet passageway and being at least partially surrounded by said first inlet passageway as viewed in a plane generally normal with respect to the flow through said additional inlet passageway, and valve means mounted adjacent the upstream ends of said inlet passageways, said valve means being adjustable from a first position where it directs all of said fluid flow through said additional inlet passageway, said additional inlet passageway being shaped to produce high velocity fluid flow in said volute section, to a second position where it allows said fluid flow through both of said passageways, and to positions intermediate between said first and second positions.

2. A housing according to claim 1, wherein said means forming said additional inlet passageway includes an inner wall, and said valve means is mounted adjacent the upstream end of said inner wall.

3. A housing according to claim 2, wherein said valve means comprises a flapper which has the downstream edge thereof pivotally mounted adjacent the upstream end of said inner wall.

4. A housing according to claim 1, wherein said one additional passageway is shaped to form a supersonic nozzle which produces said high velocity fluid flow.

5. A housing according to claim 1, wherein said first inlet passageway surrounds approximately 275° of said additional inlet passageway.

6. A housing according to claim 1, wherein said valve means comprises a flat generally rectangular flapper, and a valve housing separate from but attached to said turbine housing, said flapper being pivotally mounted on said valve housing.

7. A housing according to claim 1, wherein said valve means comprises a flat generally rectangular flapper, and a valve housing integral with said turbine housing, said flapper being pivotally mounted on said valve housing.

8. In an internal combustion engine including a plurality of combustion chambers which fire in a sequential firing order, an intake manifold for supplying fresh intake air to said chambers, and a turbocharger including a compressor connected to said intake manifold, the improvement comprising a divided exhaust duct system connected to conduct exhaust gases from said chambers, said duct system including a first branch connected to one or more of said chambers and a second branch connected to one or more of the remaining chambers, and a housing of a centripetal flow turbine of said turbocharger, said housing including a volute section, means forming a first inlet and a first passageway leading from said first inlet and forming said volute section, said first inlet being adapted to be connected to one of said branches, said housing further including means forming a second inlet connected to another of said branches, a second passageway leading from said second inlet to an outlet, said outlet being located in said first passageway and being at least partially surrounded by said first passageway, said second passageway being shaped to produce high gas velocity in said volute section, and valve means mounted adjacent said first and second inlets and movable between first and second positions and intermediate positions, said valve means when in said first position directing all of said exhaust gases through said second passageway when the engine is operating at low speeds and when in said second position directing said exhaust gases through both of said passageways.

9. Apparatus as in claim 8, wherein said second passageway is shaped to form a supersonic nozzle.

10. Apparatus as in claim 8, wherein said means forming said second inlet comprises an inner wall of said housing, and said first and said second branches closely adjoin one another and are separated by a divider, and said valve means comprises a member connected between said branches and said first and second inlets, and a flapper valve pivotally mounted adjacent the upstream end of said inner wall.

11. Apparatus as in claim 10, wherein when said valve means is in said second position said flapper valve extends substantially in alignment with said inner wall and with said divider, and when said valve means is in said first position said flapper valve angles from said inner wall to the inner surface of said connecting member.

12. Apparatus as in claim 11, wherein said flapper valve has a length which is substantially equal to the distance from said inner wall to said divider.

13. Apparatus as in claim 8, wherein said first and second passageways are arranged tangentially with respect to said volute section.

14. In an internal combustion engine including a plurality of combustion chambers, an intake manifold for supplying fresh intake air to said chambers, and a turbocharger including a compressor connected to said intake manifold, the improvement comprising an exhaust duct system connected to conduct exhaust gases from said chambers, and a housing of a centripetal flow turbine of said turbocharger, said housing including a volute section, means forming a first inlet and a first passageway leading from said first inlet and forming said volute section, said first inlet being adapted to be connected to said exhaust duct system, said housing further including means forming a second inlet connected to said exhaust duct system, a second passageway leading from said second inlet to an outlet, said outlet being located in said first passageway and being at least partially surrounded by said first passageway, said second passageway being shaped to produce high gas velocity in said volute section, and valve means mounted adjacent said first and second inlets and movable between first and second positions and intermediate positions, said valve means when in said first position directing all of said exhaust gases through said second passageway when the engine is operating at low speeds, and when in said second position directing said exhaust gases through both of said passageways.

15. Apparatus as in claim 14, wherein said engine is a two-cycle engine.

* * * * *